United States Patent [19]

Saito et al.

[11] Patent Number: 5,083,455
[45] Date of Patent: Jan. 28, 1992

[54] AIR METER FOR AN INTERNAL COMBUSTION ENGINE AND METHOD OF PRODUCING THE SAME

[75] Inventors: Yasuo Saito; Toshifumi Usui; Hirotoshi Kawano; Shinya Igarashi, all of Katsuta; Youichi Furuhashi, Ibaraki, all of Japan

[73] Assignees: Hitachi, Ltd., Tokyo; Hitachi Automotive Co., Ltd.; Hitachi Engineering Co., Ltd., both of Ibaraki, all of Japan

[21] Appl. No.: 569,027

[22] Filed: Aug. 17, 1990

[30] Foreign Application Priority Data

Aug. 28, 1989 [JP] Japan ..................... 1-220934

[51] Int. Cl.$^5$ ........................................... G01M 19/00
[52] U.S. Cl. ................................. 73/118.2; 73/204.21
[58] Field of Search ............ 73/118.2, 204.21, 204.22, 73/118.2; 123/494

[56] References Cited

U.S. PATENT DOCUMENTS

| | | | |
|---|---|---|---|
| 4,501,249 | 2/1985 | Amano et al. | 123/478 |
| 4,612,895 | 9/1986 | Kuroiwa et al. | 123/494 |
| 4,624,134 | 11/1986 | Nagano | 73/118.2 |
| 4,723,443 | 2/1988 | Usui et al. | 73/118.2 |
| 4,887,577 | 12/1989 | Arai et al. | 73/118.2 X |

FOREIGN PATENT DOCUMENTS

| | | |
|---|---|---|
| 295647 | 12/1988 | European Pat. Off. . |
| 313089 | 4/1989 | European Pat. Off. . |
| 322459 | 7/1989 | European Pat. Off. . |

Primary Examiner—Jerry W. Myracle
Attorney, Agent, or Firm—Antonelli, Terry, Stout & Kraus

[57] ABSTRACT

An air meter for an internal combustion engine. The air intake passage of the internal combustion engine includes a main passage and an L-shaped auxiliary passage. The auxiliary passage includes a first flow passage, a second flow passage and a corner portion arrnaged at a corner thereof. The first flow passage communicates to the second flow passage through the corner portion. The first flow passage is disposed in parallel with the main passage and has a hot wire sensor arranged therein. The second flow passage is arranged perpendicularly to the main passage. The first flow passage has a circular radial cross section. The second flow passage is in the shape of a groove with a bottom, the groove having a square cross-section. The first flow passage is open to the corner portion at a level of the bottom of the second flow passage. The corner portion has a circular cross section equal in diameter to and concentric to the circular radial cross section of the first flow passage, the cross section of the corner portion being taken at a level of the bottom of the groove portion and perpendicular to the first flow passage.

6 Claims, 6 Drawing Sheets

AIR METER FOR AN INTERNAL COMBUSTION ENGINE AND METHOD OF PRODUCING THE SAME

BACKGROUND OF THE INVENTION

1. Field of the Invention

The present invention relates to an air meter and a method of producing the same and more particularly but not exclusively relates to an air meter for an internal combustion engine of an automobile and a method

2. Prior Art

In the known air meter for an internal combustion engine, the air intake passage is, generally, constituted by two passages; a main passage and an auxiliary passage. A hot wire sensor is arranged in the auxiliary passage. An air meter which has an auxiliary passage arranged not to traverse the main passage is called a bypass type air meter. One typical example of the bypass type air meters is disclosed in U.S. Pat. No. 4,723,443, in which the auxiliary passage has first and second flow passages connected to each other in an L shape. The first flow passage is formed in parallel with the main passage and has a hot wire sensor disposed within it whereas the second flow passage is arranged perpendicularly to and arcuately around the main passage. In this air meter, the throttle body thereof is divided to form the second flow passage of the auxiliary passage, and an insulator is interposed between the divided parts. The second flow passage of the auxiliary passage has a shoulder portion at a location where the second flow passage communicates to the first flow passage. The shoulder portion has an enlarged width or diameter. Thus, a dead volume to the air flow in the auxiliary passage is formed at the shoulder portion.

U.S. Pat. No. 4,501,249 teaches a bypass-type air meter in which a second flow passage of an auxiliary passage is arranged radially and perpendicularly to a main passage.

Another earlier attempt is disclosed in Japanese Patent Application No. 62-148993 in which a second flow passage of an auxiliary passage is arranged to cross a main passage. This air meter is called an axial flow type air meter. In this axial flow type air meter, it is not necessary to divide the throttle body since the second passage traverses the main passage, and hence the air meter provides an advantage of the throttle body being made of one piece.

In the bypass-type air meter of U.S. Pat. No. 4,723,443, a dead volume, which a formed in the shoulder, causes a turbulence in the air flow and can involve a fluctuation of an output of the hot wire sensor and a considerable increase in S/N ratio.

U.S. Pat. No. 4,501,249 does not teach how to form the auxiliary passage of the bypass-type air meter. To form the L-shaped auxiliary passage in the throttle body, it is generally necessary to divide the throttle body and then to machine a predetermined portion thereof to form the auxiliary passage. In this case, a shoulder portion is liable to be formed at a connection portion between the first and second flow passages due to an error in machining. The shoulder portion produces a dead volume which involves the same problem as above stated.

In the axial flow type air meter of Japanese Patent Application No. 62-148993, the first and second flow passages of the auxiliary passage are formed by machining after the throttle body is formed by die casting. This machining operation is likely to produce misalignment at a corner portion or a connecting portion between the first and second flow passages. There is a considerably high possibility of a dead volume being produced, which incurs the same problem as in the other air meters of the prior art.

SUMMARY OF THE INVENTION

Accordingly, it is an object of the present invention to provide an air meter for an internal combustion engine, in which the hot wire sensor is fairly small in output fluctuation and hence is capable of providing a stable output with a fairly high accuracy as compared to hot wire sensors of the air meters according the prior art.

It is another object of the present invention to provide an air meter for an internal combustion engine and a method of producing the same, in which the dispersion in output signal between products is reduced and yield of the product is enhanced.

In one aspect of the invention, these and other objects of the present invention are achieved by an air meter for an internal combustion engine wherein: a first flow passage is communicated to the second flow passage at a corner portion; the first flow passage has a circular radial cross section; the second flow passage is in the shape of a groove with a bottom, the groove having a square cross-section; the first flow passage is open to the corner portion at a level of the bottom of the second flow passage; and the corner portion has a circular cross section substantially equal in diameter to and concentric to the circular radial cross section of the first flow passage, the cross section of the corner portion being taken at a level of the bottom of the groove portion and perpendicular to the first flow passage.

With such a construction that the corner portion has a circular cross section substantially equal in diameter to and concentric to the circular radial cross section of first flow passage, the cross section of the corner portion being taken at a level of the bottom of the groove portion and perpendicular to the first flow passage, no shoulder portion is formed at the corner portion. Thus, the air meter of this embodiment has little dead volume, and hence the air flow in the corner portion becomes stable, so that the output of the hot wire sensor arranged in the first flow passage also becomes stable.

The corner portion of the auxiliary flow passage may have a cylindrical shape or a frustoconical shape gradually enlarging the diameter thereof away from the bottom of the second flow passage. In the latter case, the frustoconical shape of the corner portion minimizes burrs which are produced during drilling the first flow passage.

The groove of the second flow passage preferably has a width smaller than the diameter of the corner portion. In this case, the corner portion does not significantly change in flow resistance even if the axis of the first flow passage is slightly misaligned, and hence the dispersion in output signal between products is reduced.

In another aspect of the present invention, the objects are also achieved by an air meter for an internal combustion engine in which: the first flow passage has a circular radial cross section; the second flow passage has a circular radial cross section; and the corner portion has a first circular cross section substantially equal in diameter to and concentric to the circular radial cross section of the first flow passage, the first cross section of the corner portion being taken along an axis of the second flow passage to be perpendicular to the first flow passage. With such a construction, little dead volume is produced in the corner portion, and hence the output of the hot wire sensor is stabilized.

Preferably, the corner portion has a second circular cross section substantially equal in diameter to and concentric to the circular radial cross section of the second flow passage, the second cross section of the corner portion being taken along an axis of the first flow passage to be perpendicular to the second flow passage, and the corner portion has a spherical outer corner. In this preferred mode of the invention, the corner portion is in the shape of a bend, and hence it is small in flow loss as compared to an elbow-shaped corner portion and stabilizes air flow more than the elbow-shaped corner portion. Thus, the output of the hot wire sensor is fairly stabilized.

In still another aspect of the present invention, the objects above described are also attained by an air meter for an internal combustion engine in which the second flow passage is in the shape of a groove having a trapezoidal cross-section, the groove having a bottom and an opening, the opening being larger in width than the bottom. Thus the groove of the first flow passage has a tapering shape diverging downwards in cross-section, and hence the throttle body is formed integrally with the second flow passage by die casting, the mold is downwardly drawn. In this event, no galling is produced between the die casting mold and the side walls of the groove, so that the side walls may become fairly smooth. Thus, the side walls may secure a required accuracy and surface irregularity without cutting them after the die casting.

In another aspect of the present invention, the objects of the present invention are accomplished by a method of fabricating an air meter for an internal combustion engine in which: a throttle body with the main passage and the auxiliary passage is formed by die casing for forming a second flow passage of the auxiliary passage in the shape of a groove having a quardrilateral cross-section and for forming a hole for the second flow passage on the basis of the shape of the groove of the first flow passage; and then, the corner portion is formed by drilling further the hole of the first flow passage with a guidance of the hole.

Thus, the corner portion is formed by forming a hole for the first flow passage on the basis of the groove shape of the second flow passage and then by cutting the corner portion with a guidance of the hole. The corner portion can be formed with a predetermined positional accuracy, so that the corner portion with no dead volume is easily produced. Thus, the output of the hot wire sensor is stabilized. Moreover, dispersion in the shape of the corner portion is minimized, and hence dispersion in output of the air meters is reduced.

DETAILED DESCRIPTION OF PREFERRED EMBODIMENTS

The invention will now be described with reference to the drawings, in which corresponding parts are designated by the same reference numerals and descriptions thereof are omitted after once given.

The first embodiment of the present invention will be described with reference to FIGS. 1 to 3.

Figure 1:
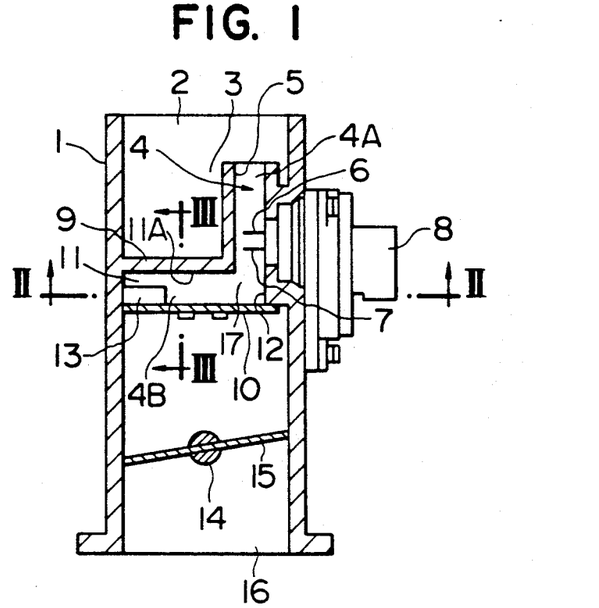
FIG. 1 is an axial cross-sectional view of an air meter according to a first embodiment of the present invention.
Figure 2:
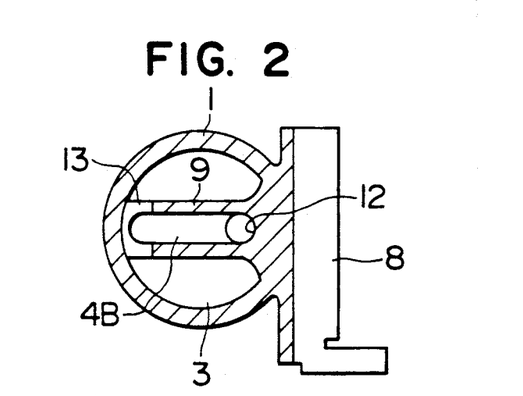
FIG. 2 is a sectional view taken along the line II—II in FIG. 1.
Figure 3:
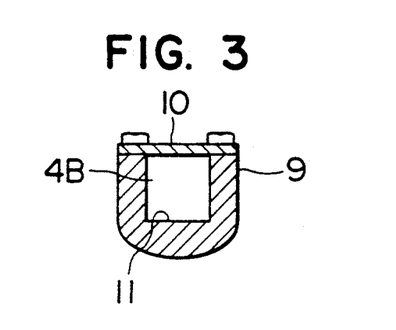
FIG. 3 is a sectional view taken along the line III—III in FIG. 1.

In FIGS. 1 and 2, sucked air which has passed through an air cleaner (not shown) enters into a throttle body 1 through an inlet opening 2 and then branches to flow into a main flow passage 3 and an auxiliary flow passage 4. The main flow passage 3 is formed within the inner wall of the throttle body 1. The auxiliary flow passage 4 is made up of a first flow passage 4A and a second flow passage 4B which is perpendicular to the main flow passage 3.

The first flow passage 4A of the auxiliary flow passage 4 is a tubular passage having a 10 mm radius circular cross-section and is formed within a probe holder 5 which is projected into the main flow passage 3 from the inner circumferential surface of the throttle body 1. A hot wire sensor 6 and a temperature compensating device 7 are provided to the inner wall of the probe holder 5 in the first flow passage 4A so that their distal ends project to the vicinity of the center of the first flow passage 4A. The amount of heat removed from the hot wire sensor 6 varies according to a flow rate of air in the first flow passage 4A. This variation generates the difference in resistance between the hot wire sensor 6 and the temperature compensating device 7, so that in response to the flow rate, an electric signal is outputted from a circuit within an air meter body 8, screwed to the throttle body 1, according to a difference in potential produced by the difference in resistance.

The probe holder 5 has a bridge 9 integrally formed with it at its lower end in an L-shape. The bridge 9 is also integrally formed at its opposite ends with the inner circumferential wall of the throttle body 1. A groove 11 is formed in the bridge 9 to open downwards and the bottom open end thereof is closed with a plate 10 screwed to the bridge 9 as shown in FIG. 1. The groove 11 has a square cross-section as shown in FIG. 3. The first flow passage 4A communicates to the second flow passage 4B through a corner portion or air flow deflecting portion 17 and opens at its lower or downstream end to the corner portion 17 at a level of a bottom 11A of the groove 11. Air which has passed the hot wire sensor 6 and the temperature compensating device 7 in the first flow passage 4A flows into the corner portion 17 where the air flow is deflected toward the second flow passage, and then the air flows into the second flow passage 4B.

A half of the circumferential surface of the corner portion 17 is defined by an arcuate wall 12. The corner portion 17 has a cylindrical shape such that a circular cross-section thereof which is perpendicular to the first flow passage 4A is equal in diameter to and concentric with a radial cross-section of the first flow passage 4A as shown in FIG. 2. The semi-cylindrical surface of the arcuate wall 12 may be formed by drilling further the first flow passage 4A downwards after the throttle body 1 is formed by die casting. With such a semi-cylindrical surface of the arcuate wall 12, any dead volume is eliminated at the corner portion 17 or joining portion of the first flow passage 4A and second flow passage 4B, and hence induced air smoothly flows through the second flow passage 4B and then flows out of an outlet 13 of the second flow passage 4B to join air flow in the main flow passage 3.

The joined air is metered by a clearance defined by a throttle valve 15 and a circumferential wall of an outlet opening 16 of the throttle body 1 and is then supplied to an engine (not shown). The throttle valve 15 is mounted on a throttle shaft 14 which is interlocked with an accelerator (also not shown).

With such a construction, the air meter of this embodiment has little dead volume at the corner portion 17 of the auxiliary flow passage 4, and hence the air flow in the corner portion 17 becomes stable, so that the output of the hot wire sensor 6 also becomes stable. Thus, an air meter with a stable output characteristic having a high accuracy is obtained, and yield of the product is fairly increased. When the air meter of this embodiment is mounted to an engine of an automobile, the rotation of the engine is smoothly controlled with a low noise.

Figure 4:
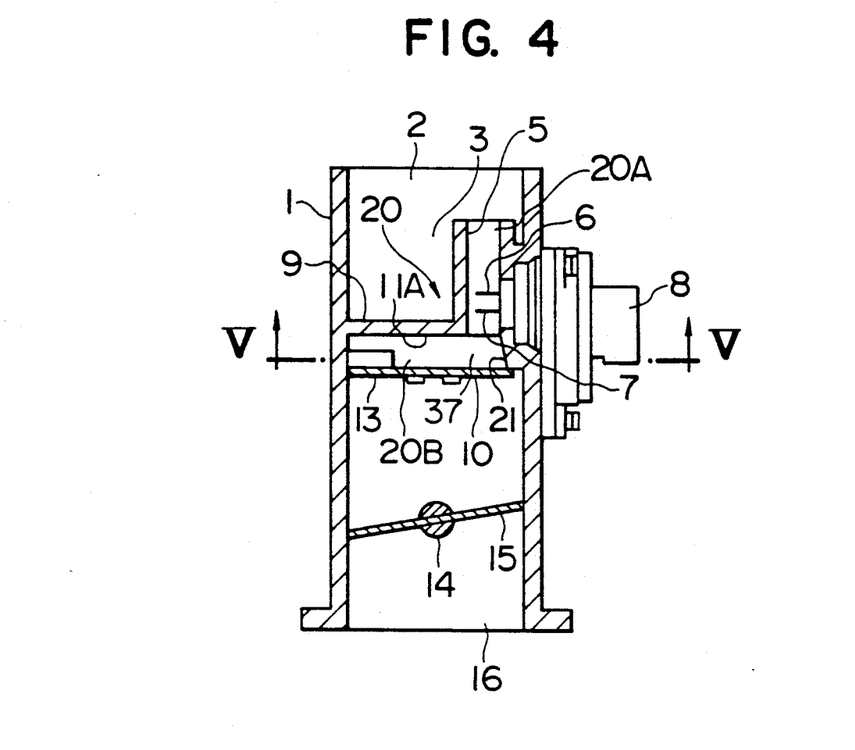
FIG. 4 is an axial cross-sectional view of an air meter in accordance with a second embodiment of the present invention.
Figure 5:
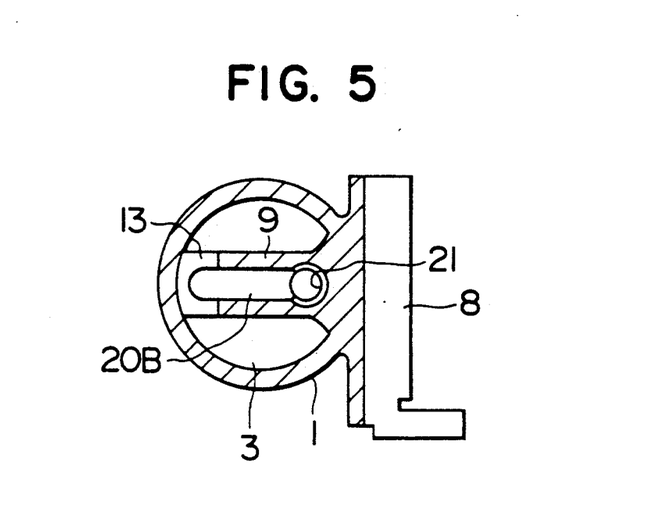
FIG. 5 is a sectional view taken along the line V—V in FIG. 4.

A second embodiment of the present invention is illustrated in FIGS. 4 and 5, in which after passing a hot wire sensor 6 and a temperature compensating device 7 in a first flow passage 20A, air flows through a corner portion 37 and then into a second flow passage 20B.

A large parts of the circumferential surface of the corner portion 37 is defined by a conical wall 21. The first flow passage 20A joins the second flow passage 20B through the corner portion 37. The corner portion 37 has a substantially frustoconical shape such that a cross-section thereof which is perpendicular to the first flow passage 20A is circular and concentric with a radial cross-section of the first flow passage 20A as shown in FIG. 5. The circle of the cross-section of the corner portion 37 has a radius equal to the circle of the radial cross-section of the first flow passage 20A at a level of the bottom 11A and gradually increases its radius downwardly. This shape of the conical wall 21 is formed by a tapered portion of a die casting mold during the die casting.

The second embodiment achieves a considerable raise in productivity as well as the same advantage as the first embodiment. This is because the shape of the conical wall 21 of the corner portion 37 minimizes burrs which are produced during drilling further the first flow passage 20A to form the corner portion 37.

Figure 6:
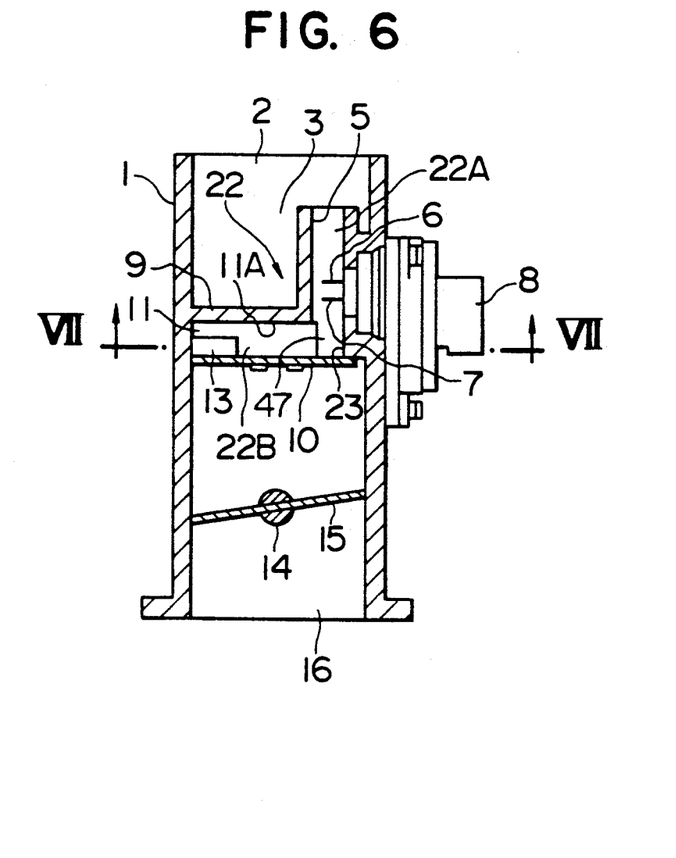
FIG. 6 is an axial cross-sectional view of an air meter in accordance with a third embodiment of the present invention.
Figure 7:
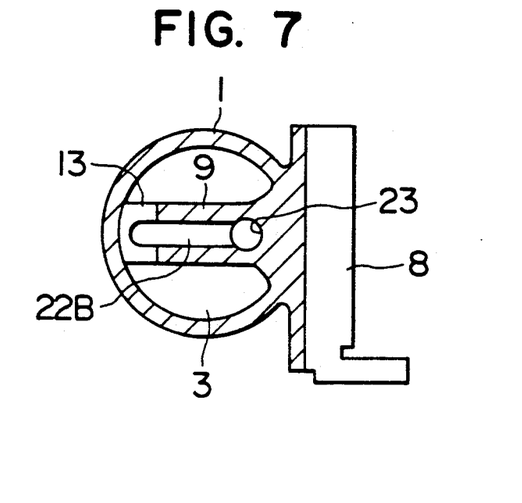
FIG. 7 is a sectional view taken along the line VII—VII in FIG. 6.
Figure 8:
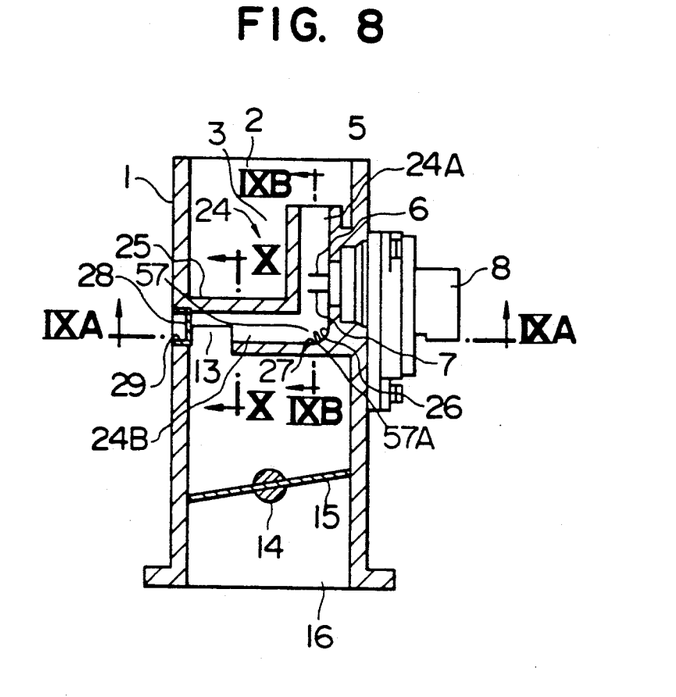
FIG. 8 is an axial cross-sectional view of an air meter in accordance with a fourth embodiment of the present invention.

A third embodiment of the present invention will be described with reference to FIGS. 6 and 7, in which a large part of the circumferential surface of a corner portion 47 is defined by an arcuate wall 23. The second flow passage 22B communicates to the first flow passage 22A through the corner portion 47. The corner portion 47 has a cylindrical shape similar to the shape of the corner portion 17 of the first embodiment, but the width of the groove 11 formed in the bridge 9 is smaller than the diameter of the arcuate wall 23. The groove 11 of this embodiment is sufficiently large in depth so that the second flow passage 22B is equal in cross-section to the first flow passage 22A.

In the third embodiment, the corner portion 47 does not significantly change in flow resistance even if the axis of the first flow passage 22A is slightly misaligned, and hence the dispersion in output signal between products is reduced. Thus, the air meter of this embodiment provides a considerable raise in yield other than the same effect as the air meter of the first embodiment.

Figure 9A:
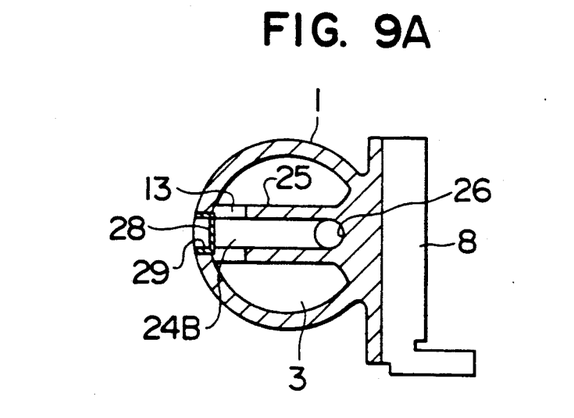
FIG. 9A is a sectional view taken along the line IXA—IXA in FIG. 8.
Figure 9B:
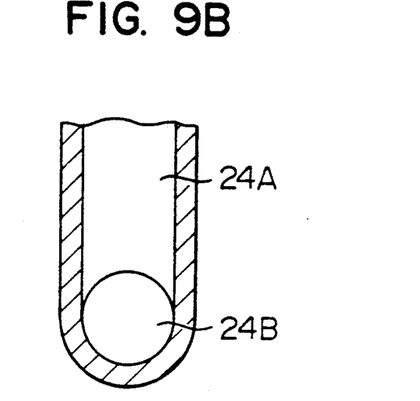
FIG. 9B is a enlarged fragmentary sectional view taken along the line IXB—IXB in FIG. 8.
Figure 10:
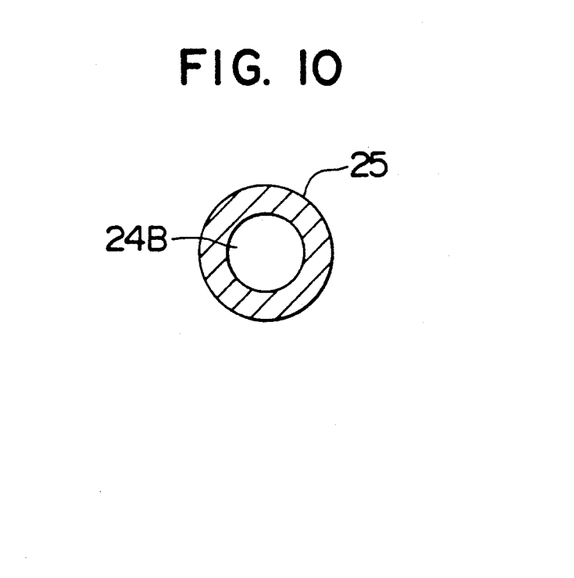
FIG. 10 is a view taken along the line X—X in FIG. 8.

A fourth embodiment of the present invention is illustrated in FIGS. 8, 9A, 9B and 10, in which an auxiliary flow passage 24 is formed in the shape of a bend. A second flow passage 24B of the auxiliary flow passage 24 is formed in a bridge 25 which radially extends through a main flow passage 3. The second flow passage 24B has a circular vertical cross-section as shown in FIG. 10. The second flow passage 24B is communicated through a corner portion 57 to a first flow passage 24A. The corner portion 57 has a first circular cross-section such that the circle of the cross-section is equal in diameter to and concentric with a circle of a radial cross-section of the first flow passage 24A as shown in FIG. 9A. The first circular cross-section of the corner portion 57 is taken along the axis of the second flow passage 24B. In this embodiment, the corner portion 57 has a second circular cross-section equal in diameter to and concentric to the circular radial cross-section of the second flow passage 24B as shown in FIG. 9B. The second cross-section of the corner portion 57 is taken along the axis of the first flow passage 24A to be perpendicular to the second flow passage 24B. The corner portion 57 has a spherical outer corner 57. A air which has passed the hot wire sensor 6 and temperature compensating device 7 is smoothly converted by the spherical outer corner 57A and flows into the second flow passage 24B.

The spherical outer corner 57A is formed by using a mold having a complimentary spherical portion in die casing of the throttle body 1. Alternatively, the spherical outer corner 57A is formed when the first flow passage 24A and second flow passage 24B are drilled by a cutter having a spherical tip after the throttle body 1 is formed by die casting. Thus, the forming of the spherical outer corner 57A does not incur any additional cost. The mold and the cutter are inserted through a hole 28 formed through the wall of the throttle body 1 for forming the spherical outer corner 57A. The hole 28 is closed by a plug 29, and an outlet 13 is formed through a distal end of the bridge 25. Thus, air flows out of the second flow passage 24B through the outlet 13 and joins an air flow in the main flow passage 3.

The fourth embodiment of the present invention has the corner portion 57 with little dead volume and thus achieves the same effect as the first embodiment. Moreover, the auxiliary flow passage 24 is in the shape of a bend with the spherical outer corner 57A, and hence the passage 24 is small in flow loss as compared to an elbow-shaped auxiliary passage and stabilizes air flow more than the elbow-shaped auxiliary passage. These features achieves an advantageous effect of the output of the hot wire sensor being fairly stabilized.

Figure 11:
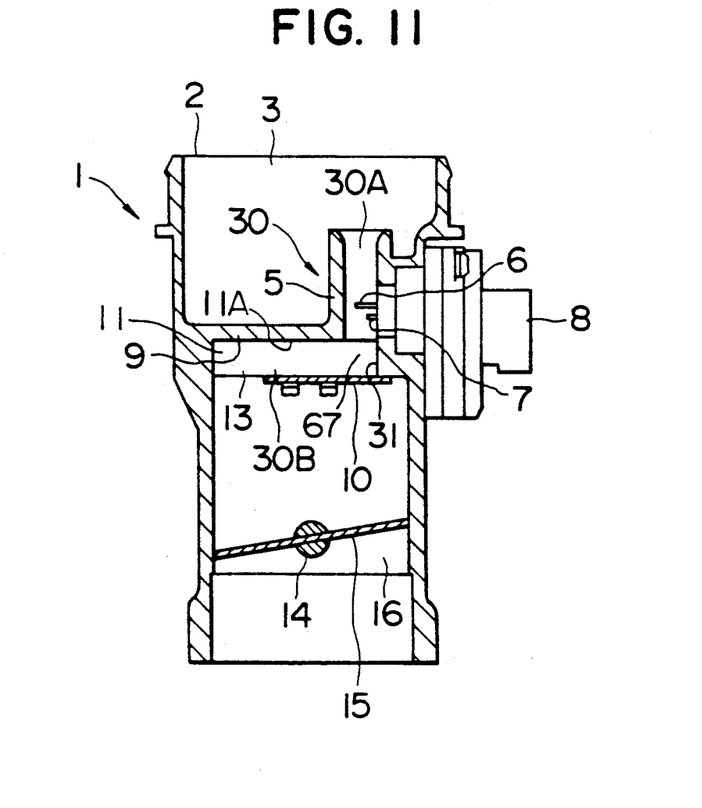
FIG. 11 is an axial cross-sectional view of an air meter in accordance with a fifth embodiment of the present invention.
Figure 12:
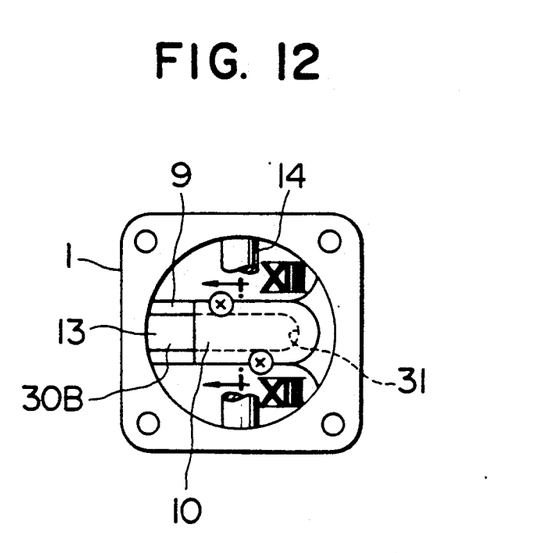
FIG. 12 is a bottom view of the air meter of FIG. 11 in which the throttle valve is removed for illustration purpose.
Figure 13:
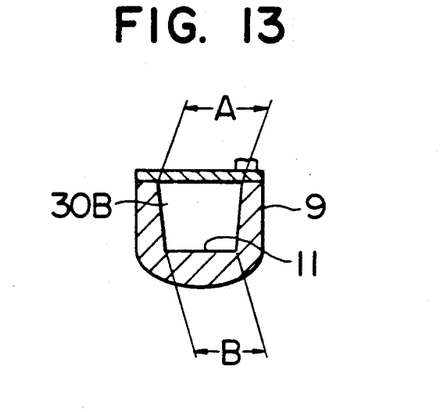
FIG. 13 is a sectional view taken along the line XII—XII in FIG. 12.

A fifth embodiment of the present invention is illustrated in FIGS. 11 and 12. In this embodiment, a second flow passage 30B of an auxiliary flow passage 30 has a structure similar to the second flow passage 4B of the auxiliary flow passage 4 of the first embodiment. That is, a bridge 9 is arranged to radially traverse a main flow passage 3 and is provided with a groove 11 open downwards. A plate 10 is fastened to the bridge 9 by screws to close the groove 11. The first flow passage 30A is communicated to the second flow passage 30B through a corner portion 67. The corner portion 67 has a cylindrical shape such that a circular cross-section thereof which is perpendicular to the first flow passage 30A is equal in diameter to and concentric with a radial cross-section of the first flow passage 30A. The probe holder 5 is provided with an arcuate wall 31 which substantially defines a half of the circumferential surface of the corner portion 57. The groove 11 of the second flow passage 30B has a trapezoidal cross-section having parallel bottom 11A and opening 11B as shown in FIG. 13. The width A of the opening 11B is longer than the width B of the bottom 11A. Thus, side walls 11D and 11D of the groove 11 are inclined more than 0.5° to a vertical plane. The groove 11 has a pair of corner edges 11C and 11C each having a radius larger than 0.5 mm.

The throttle body 1 including the main flow passage 3 and the auxiliary flow passage 30 is formed by die casting. In this event, the groove 11 having a trapezoidal cross-section is directly formed by a die casting mold. A prepared hole of the first flow passage 30A is also formed by the mold for forming the groove 11 on the basis of the shape of the groove 11. Then, the corner portion 67 is formed by drilling the probe holder 5 with a guidance of the hole of the first flow passage 30A.

In this embodiment, the groove 11 of the first flow passage 30A has a tapering shape diverging downwards in cross-section, and hence after the throttle body 1 is formed by die casting, the mold is downwardly drawn in FIG. 11. In this event, no galling is produced between the die casting mold and the side walls 11D and 11D of the groove 11, so that the side walls 11D and 11D may become fairly smooth. Thus, the side walls may secure a required accuracy and surface irregularity without cutting them after the die casting, and the man-day of forming the second flow passage 30B is reduced.

As stated, the prepared hole of the first flow passage 30A is formed together with the second flow passage 30B by a single mold on the basis of the shape of the groove 11. Then, the corner portion 67 is formed by drilling the probe holder 5 with a guidance of the prepared hole. This enables the corner portion 67 to be formed with a predetermined positional accuracy, so that the corner portion 67 has no dead volume. Thus, the output of the hot wire sensor 6 is stabilized. Moreover, dispersion in the shape of the corner portion 67 is minimized, and hence dispersion in output of the air meters produced is reduced. This fairly increases yield.

In this embodiment, the groove 11 has arcuate edges 11C and 11C each having a radius larger than 0.5 mm, and hence corresponding edge portions of the mold is enhanced in strength with a result in an increase in life of the mold.

What is claimed is:

1. An air meter for an internal combustion engine in which an air intake passage of the internal combustion engine includes a main passage and an L-shaped auxiliary passage, the auxiliary passage including a first flow passage, a second flow passage and a corner portion arranged at a corner thereof, the first flow passage communicating with the second flow passage through the corner portion, the first flow passage being disposed substantially in parallel with the main passage and having a hot wire sensor arranged therein and the second flow passage being arranged substantially perpendicularly to the main passage, wherein:

the first flow passage has a circular radial cross section;

the second flow passage is in the shape of a groove with a bottom, the groove having a square cross-section;

the first flow passage is open to the corner portion at a level of the bottom of the second flow passage; and the corner portion has a circular cross section substantially equal in diameter to and concentric to the circular radial cross section of the first flow passage, said cross section of the corner portion being taken at a level of the bottom of the groove portion and perpendicular to the first flow passage and the corner portion being substantially in the shape of a frustum of a cone gradually enlarging the diameter thereof away from the bottom of the second flow passage.

2. An air meter for an internal combustion engine in which an air intake passage of the internal combustion engine includes a main passage and an L-shaped auxiliary passage, the auxiliary passage including a first flow passage, a second flow passage and a corner portion arranged at a corner thereof, the first flow passage communicating with the second flow passage through the corner portion, the first flow passage being disposed substantially in parallel with the main passage and having a hot wire sensor arranged therein and the second flow passage being arranged substantially perpendicularly to the main passage, wherein:

the first flow passage has a circular radial cross section;

the second flow passage is in the shape of a groove with a bottom, the groove having a square cross-section;

the first flow passage is open to the corner portion at a level of the bottom of the second flow passage; and the corner portion has a circular cross section substantially equal in diameter to and concentric to the circular radial cross section of the first flow passage, said cross section of the corner portion being taken at a level of the bottom of the groove portion and perpendicular to the first flow passage and the groove of the second flow passage having a width smaller than the diameter of the corner portion.

3. In an air meter for an internal combustion engine in which the air intake passage of the internal combustion engine includes a main passage and an L-shaped auxiliary passage, the auxiliary passage including a first flow passage, a second flow passage and a corner portion arranged at a corner thereof, the first flow passage communicating to the second flow passage through the corner portion, the first flow passage being disposed substantially in parallel with the main passage and having a hot wire sensor arranged therein and the second flow passage being arranged substantially perpendicularly to the main passage, the improvement wherein:

the first flow passage has a circular radial cross section;

the second flow passage has a circular radial cross section and an axis; and the corner portion has a first circular cross section substantially equal in diameter to and concentric to the circular radial cross section of the first flow passage, the first cross section of the corner portion being taken along the axis of the second flow passage to be perpendicular to the first flow passage;

wherein the second flow passage has an axis, the corner portion has a second circular cross section substantially equal in diameter to and concentric to the circular radial cross section of the second flow passage, the second cross section of the corner portion being taken along the axis of the first flow passage to be perpendicular to the second flow passage and the corner portion has a spherical outer surface configuration.

4. In an air meter for an internal combustion engine in which an air intake passage of the internal combustion engine includes a main passage and an L-shaped auxiliary passage, the auxiliary passage including a first flow passage, a second flow passage and a corner portion arranged at a corner thereof, the first flow passage communicating to the second flow passage through the corner portion, the first flow passage being disposed substantially in parallel with the main passage and having a hot wire sensor arranged therein and the second flow passage being arranged substantially perpendicularly to the main passage, the improvement wherein:

the second flow passage is in the shape of a groove having a trapezoidal cross-section, the groove having a bottom and an opening, the opening being larger in width than the bottom.

5. An air meter for an internal combustion engine as recited in claim 4, wherein the second flow passage has side walls facing to each other, the side walls being inclined more than 0.5° to a vertical plane.

6. An air meter for an internal combustion engine as recited in claim 4, wherein the second flow passage has arcuate edges at the bottom, each arcuate edge having a radius more than 0.5 mm.

* * * * *